Dec. 27, 1966  G. E. FRANCK  3,294,425
FLARED FITTING
Filed Aug. 27, 1964
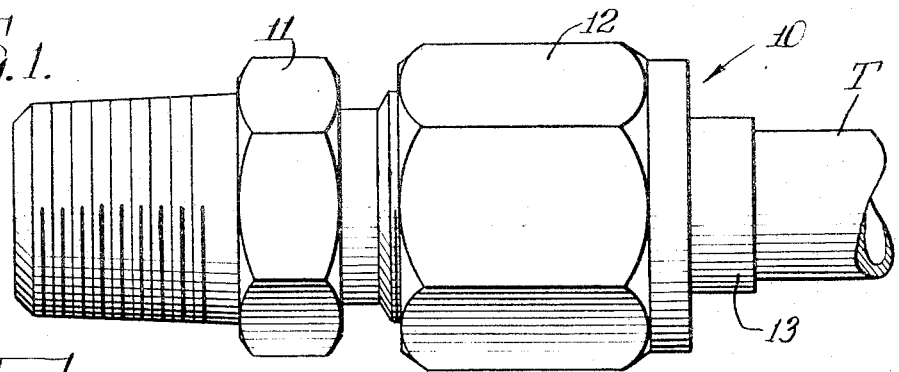
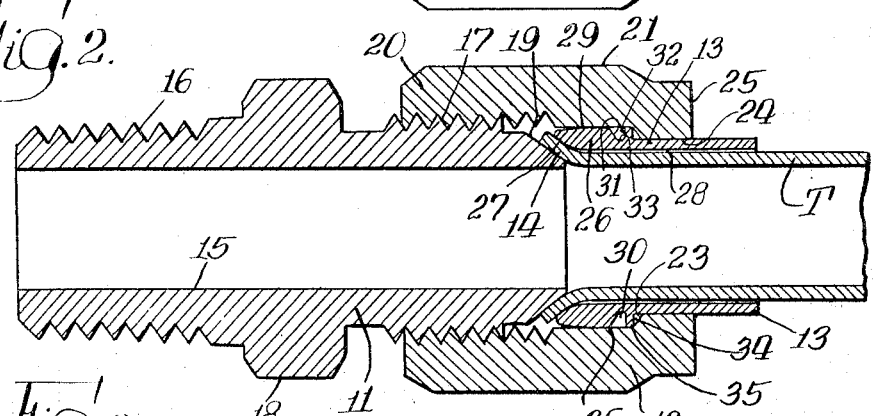
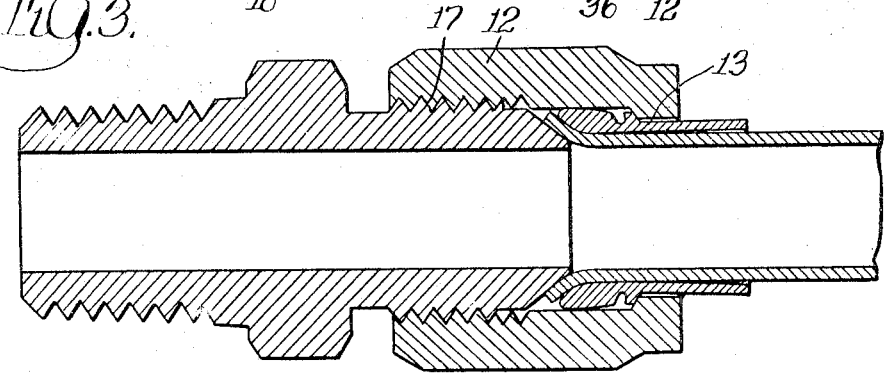
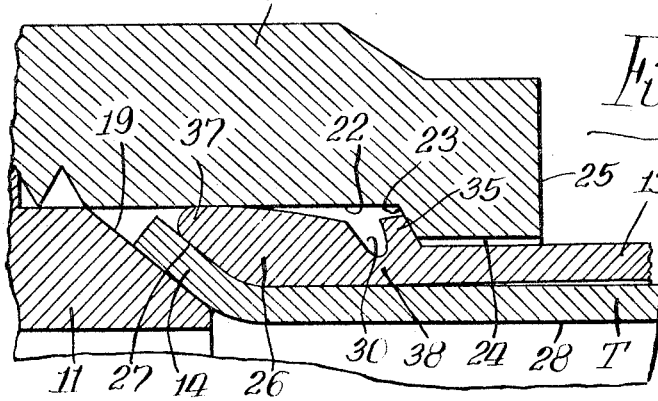
INVENTOR.
George E. Franck
BY
Hofgren, Wegner, Allen,
Stellman & McCord Attys.

.

United States Patent Office 3,294,425
Patented Dec. 27, 1966

3,294,425
FLARED FITTING
George E. Franck, Morton Grove, Ill., assignor to Imperial-Eastman Corporation, a corporation of Illinois
Filed Aug. 27, 1964, Ser. No. 392,397
5 Claims. (Cl. 285—334.5)

This invention relates to tube fittings and in particular to fittings for use in connecting tubing having a flared end.

In one form of tube fitting, the flared end of a tube to be connected is sealingly engaged with a frusto-conical body portion, sealing pressure being applied against the tubing by means of a pressure sleeve coacting with a nut member. The present invention comprehends an improved sleeve member for use in such a fitting which provides an improved sealed retention of the flared tube end therein.

Thus, a principal object of the present invention is the provision of a new and improved flared tube fitting.

Another object of the invention is the provision of such a tube fitting having a new and improved sleeve member for sealingly retaining the flared tube end therein.

A further object of the invention is the provision of such a tube fitting wherein the sleeve member is arranged to be deformed in the make-up of the fitting in a new and improved manner for improved retention of the flared tube end in the fitting.

Still another object of the invention is the provision of such a tube fitting comprising a body member having an outer end provided with an exterior, axially outwardly narrowing, frusto-conical, flare surface and a bore opening coaxially through the surface, a nut member having a bore including an axially inner, cylindrical surface and an axially outer frusto-conical cam surface narrowing axially outwardly at a small angle, and an annular sleeve member having an axially inner, frusto-conical pressure surface, an outer, frusto-conical axially outwardly widening frusto-conical stop surface, an annular, radially outwardly opening groove including a frusto-conical, axially outwardly narrowing, axially inner surface defining with the stop surface an annular edge, a first transverse axially outer surface, and a rounded radially inner surface extending between the axially inner and outer surfaces of the groove, and a second transverse axially outer surface spaced axially outwardly of the first transverse surface to define therebetween an annular, radially outwardly projecting flange.

Other objects and advantages of the invention will be apparent from the following description taken in connection with the accompanying drawing wherein:

FIGURE 1 is an elevation of a tube fitting embodying the invention having a tube end connected thereto;

FIGURE 2 is a diametric section of the fitting as at the commencement of the make-up thereof;

FIGURE 3 is a diametric section of the fitting as at completion of the make-up thereof; and FIGURE 4 is a fragmentary enlarged diametric section illustrating in greater detail the arrangement of the fitting elements as at completion of the make-up of the fitting.

In the exemplary embodiment of the invention as disclosed in the drawing, a fitting generally designated 10 is shown to comprise a body member 11, a nut member 12, and a sleeve member 13 cooperatively associated to sealingly couple the flared end 14 of a tube T thereto.

More specifically, body member 11 includes a through bore 15 extending coaxially through an externally threaded axially inner end 16, and an externally threaded axially outer end 17. Intermediate ends 16 and 17, the body member may be provided with a plurality of flats 18 such as for engagement by a suitable tool (not shown) during make-up of the fitting. The outer end 17 of the body member includes a frusto-conical axially outwardly narrowing flare surface 19 through which bore 15 coaxially opens at the outer end thereof.

The nut member 12 includes an axially inner, interiorly threaded portion 20 arranged for threaded engagement with body member threaded portion 17. The exterior of the nut member is provided with a plurality of flats 21 for engagement by a suitable tool (not shown) as during the make-up of the fitting. Axially outwardly of the threaded portion 20, the nut member is interiorly defined by a cylindrical surface 22 and an axially outwardly contiguous, frusto-conical axially outwardly narrowing cam surface 23 opening into a cylindrical surface 24 which in turn opens axially outwardly through a radial end surface 25 of the nut member.

Sleeve member 13, as best shown in FIGURE 2, includes an axially inner end portion 26 having a frusto-conical axially outwardly narrowing, axially inner pressure surface 27 opening into a cylindrical bore 28 having a diameter slightly larger than the outside diameter of the tube T to be coupled. The outer surface 29 of the sleeve end portion 26 comprises a frusto-conical axially outwardly widening stop surface. Axially outwardly of the surface 29, the sleeve member is provided with an annular, radially outwardly opening groove 30 defined by an axially inner frusto-conical axially outwardly narrowing surface 31, an axially outer radial surface 32, and a radially inner rounded bottom surface 33 extending between surfaces 31 and 32.

The sleeve member 13 further includes a second radial surface 34 spaced axially outwardly of the radial surface 32 of groove 30 to define therebetween an annular, radially outwardly projecting flange 35. The outer diameter of flange 35 and the edge 36 defined by the inner section of frusto-conical surface 29 and frusto-conical surface 31 of the sleeve member is preferably substantially equal to the diameter of cylindrical surface 22 of the nut member 12. The frusto-conical surface 29 herein extends at a slight angle to the axis of the fitting. Illustratively, the angle may be approximately 2 degrees. The cam surface 23 herein extends at an angle of approximately 12 degrees to a radial plane.

In making up the fitting, the nut member 12 and sleeve member 13 are firstly installed on the end of the tube T. The end 14 of the tube is then flared as by suitable conventional tube flaring means (not shown). The end of the tube is then brought into circumjacent relationship to the flare surface 19 and the nut member 12 is then threaded onto threaded portion 17 of the body member as by finger advancement to the position of FIGURE 2. Further advancement of the nut member 12 onto the body member thread 17 is then effected by the application of suitable tools such as wrenches (not shown) to the surfaces 21 of the nut member and 18 of the body member to urge the nut member to the position of FIGURE 3.

Referring now to FIGURE 4, in moving to the final position of FIGURE 3, the nut member 12 forces the sleeve member 13 against the flared end 14 of the tube T to effect a sealed connection thereof with the body member 11. More specifically, the action of cam surface 23 against flange 35 of the sleeve member firstly forces the pressure surface 27 upwardly along the flare 14 of the tube end to reverse the configuration of the outwardly widening frusto-conical surface 29 to an outwardly narrowing configuration. In doing so, the tip 37 of the sleeve member portion 26 is radially expanded into engagement with the cylindrical surface 22 of the nut member. The action of the cam surface 23 against flange 35 further deforms the flange to an axially inwardly inclined arrangement, as shown in FIGURE 4. Sleeve member 13 is preferably formed of a resilient material such as metal.

The resiliency of the flange 35 permits limited movement of the nut member relative to the body member such as occurring in a vibration of the fitting while maintaining a forceful pressure on the nose portion 37 to maintain its engagement with the cylindrical surface 22 and its pressure transmission to the tube flared end 14 for maintaining the sealed connection of the tube to the body member notwithstanding the vibration. The outturning of the nose or tip portion 37 of the sleeve member further deforms the groove 30 by pivoting the two opposite end portions of the sleeve member about a central annular portion 38 thereof, thereby further improving the resilient, vibration resisting characteristics of the sleeve member in the made-up arrangement of the fitting.

Thus, the sleeve member is retained by the nut member at the spaced portions 37 and 35 to deform the inner portion 26 of the sleeve member in such a manner as to positively force the tube flared end 14 against the flare surface 19 of the body member thereby to provide an improved, positive sealed connection of the flared tube to the body member. The sleeve member further provides improved resistance to vibration and the like. The fitting is extremely simple and economical of construction, while yet providing the above discussed advantages whereby an improved sealed connection of the flared tube end to the fitting is obtained.

While I have shown and described one embodiment of my invention, it is to be understood that it is capable of many modifications. Changes, therefore, in the construction and arrangement may be made without departing from the spirit and scope of the invention as defined in the appended claims.

I claim:

1. A tube fitting for connection to a tube having a flared end, comprising:

a body member having an outer end provided with an exterior, axially outwardly narrowing, frusto-conical, flare surface for sealing engagement by said flared end of the tube, and a bore opening coaxially through said surface;

a nut member having a bore including an axially inner, cylindrical surface and an axially outer frusto-conical cam surface narrowing axially outwardly at a small angle, said body and nut members having cooperating thread means for coaxially urging said cam surface toward said flare surface as an incident of relative rotation therebetween; and an annular sleeve member in said nut member bore and having an axially inner, frusto-conical pressure surface, a radially outer, frusto-conical axially outwardly widening frusto-conical stop surface concentrically juxtaposed to said cylindrical surface of the nut member bore, an annular, radially outwardly opening groove including a frusto-conical, axially outwardly narrowing, axially inner surface defining with said stop surface an annular edge, a first transverse axially outer surface, and a rounded radially inner surface extending between said axially inner and outer surfaces of said groove, and a second transverse axially outer surface spaced axially outwardly of said first transverse surface to define therebetween an annular, radially outwardly projecting flange, the inner diameter of the unconstricted sleeve being slightly greater than the outer diameter of the tube whereby forceful axially inward movement of said nut member cam surface against said flange causes said stop surface to have an axially outwardly narrowing configuration in abutment with said cylindrical nut member surface.

2. The tube fitting of claim 1 wherein each of said flange surfaces is radial.

3. The tube fitting of claim 1 wherein said cam surface of the nut member narrows at an angle of approximately 12°.

4. The tube fitting of claim 1 wherein the undeformed outer diameter of said flange and said sleeve edge is substantially equal to the diameter of said cylindrical surface of the nut member.

5. The tube fitting of claim 1 wherein said stop surface extends at an angle of approximately 2 degrees to the axis of the fitting.

References Cited by the Examiner

UNITED STATES PATENTS

| | | | |
|---|---|---|---|
| 1,977,241 | 10/1934 | Parker | 285—334.5 |
| 2,390,103 | 12/1945 | Johnson | 285—354 X |
| 2,404,142 | 7/1946 | Parker | 285—114 |
| 2,466,317 | 4/1949 | Kane | 285—334.5 X |
| 2,496,510 | 2/1950 | Wolfram | 285—334.5 X |
| 2,522,785 | 9/1950 | Hanson | 285—382.7 X |
| 2,930,635 | 3/1960 | Woodling | 285—341 |
| 3,055,684 | 9/1962 | Currie | 285—382.7 X |

FOREIGN PATENTS

| | | |
|---|---|---|
| 391,140 | 4/1933 | Great Britain. |

CARL W. TOMLIN, *Primary Examiner.*

D. W. AROLA, *Assistant Examiner.*